United States Patent [19]

Ikemizu et al.

[11] 4,246,628
[45] Jan. 20, 1981

[54] DRIVING MECHANISM FOR RETRACTABLE LAMPS OF MOTOR VEHICLES

[75] Inventors: Naoyuki Ikemizu, Hiroshima; Kiyohide Terada, Yono, both of Japan

[73] Assignees: Toyo Kogyo Co., Ltd., Hiroshima; Tanaka Instrument Co., Ltd., Yono, both of Japan

[21] Appl. No.: 950,516

[22] Filed: Oct. 11, 1978

[30] Foreign Application Priority Data

Oct. 13, 1977 [JP] Japan ................. 52-137781[U]

[51] Int. Cl.³ ................. B60Q 1/06; B60Q 11/00
[52] U.S. Cl. ................. 362/65; 74/42; 362/66; 362/80
[58] Field of Search ................. 362/64, 65, 66, 80, 362/70; 74/42, 43

[56] References Cited

U.S. PATENT DOCUMENTS

| 1,411,147 | 3/1922 | Acid | 362/66 |
| 1,601,828 | 10/1926 | Hazelton | 362/66 |
| 2,312,005 | 2/1943 | Smith | 362/65 |
| 3,532,872 | 10/1970 | Hall | 362/65 |
| 3,742,205 | 6/1973 | Beauregard | 362/65 |
| 3,758,772 | 9/1973 | Eyb | 362/65 |

Primary Examiner—Harold J. Tudor
Attorney, Agent, or Firm—Wenderoth, Lind & Ponack

[57] ABSTRACT

A driving mechanism for selectively disposing retractable lamps of a motor vehicle pivotally connected to a body at a portion thereof, either in a housing or in an exposed position, which mechanism has a first paired link-rod to be driven by a motor, and a second paired link-rod pivotally interconnecting the first paired link-rod and the retractable lamp, with one end of the second link being pivotally connected to the body, wherein respective apparent longitudinal axes of the first and the second paired link-rod are arranged to be aligned when the retractable lamp is brought into the exposed position thereof. Additionally, an axis passing through one end of the second link pivotally connected to the body and a pivot joint at which the first rod is pivotally connected with the second link, and the apparent longitudinal axis of the first paired link-rod are further arranged to meet each other at right angles.

4 Claims, 6 Drawing Figures

DRIVING MECHANISM FOR RETRACTABLE LAMPS OF MOTOR VEHICLES

BACKGROUND OF THE INVENTION

This invention relates to retractable lamps, for example, head lamps or head lights of a motor vehicle, and more particularly, a driving mechanism for pivotally driving the retractable lamp to be selectively housed in or exposed from the outer surface of the body concerned.

Referring now to FIG. 1, there is shown a conventional driving mechanism for selectively housing or exposing the retractable lamp.

Conventionally, a base portion of a head lamp b of the above described type is pivotally mounted on a bracket secured to a body a, and the bottom portion of the head lamp b is relatively connected to a portion of the conventional driving mechanism c. More specifically, the bottom portion of the head lamp b is pivotally connected to one end of a rod d, the other end of which is further connected to one end of a link e. The link e has the other end mounted on the shaft of a worm wheel h which in turn is driven by a conventional arrangement comprising an electric motor f and a worm g secured to the main spindle of the electric motor f, as illustrated in FIG. 1. Furthermore, a lamp cover i and a pair of stop to prevent excess pivotal movement of the head lamp b, i.e., a stop k to prevent the head lamp b from being moved to far into the body and a stop j to prevent the reverse excess movement of the head lamp b are provided.

By the conventional arrangement described in the foregoing, the housing and exposing operations of the head lamp are accomplished in a manner as described hereinbelow.

After being pivotally driven following the rotational movement of the worm wheel h caused by the worm wheel-worm engagement when the electric motor f is driven, the link e causes the head lamp b to be pivotally moved through the pivotal movement of the rod d.

More specifically, when the link e is pivotally moved counterclockwise, the link e draws the rod d to the right in FIG. 1 and thereby, the head lamp is successively, pivotally moved counterclockwise with respect to the body a, whereby the head lamp b is in the body a housed. On the contrary, the head lamp b is exposed from the outer surface of the body a when the link e is pivotally moved in the reverse direction.

As is clear from the foregoing description, the movement for causing the head lamp to be properly disposed in the housed state or in the exposed state provided by the conventional driving mechanism requires a well-defined special arrangement for the control system associated with the electric motor so as to provide an accurate stopping actuation of the electric motor and thereby to prevent the excess movement of the head lamp.

Therefore, without a special arrangement for the control system mentioned above, the accomplishment of proper disposition of the head lamp is generally quite difficult, and naturally, deviation from the predetermined stopping position of the electric motor cannot be avoided. The deviation bring about a resultant deviation of the position of the optical axis of the head lamp from the desired position of 1 to 2 degrees. Since the permissible deviation in this angle is generally required to be less than 0.6 degrees, a resultant angular deviation of 1 to 2 degrees is too large to be allowed in a practical arrangement of the retractable head lamps. For decreasing the deviation mentioned above, although improvement in the accuracy of the control system associated with the electric motor will naturally cause the motor to be properly actuated in a predetermined manner, the arrangement needed to achieve such an improvement is generally quite expensive.

SUMMARY OF THE INVENTION

Accordingly, an essential object of the present invention is to provide a driving mechanism for retractable lamps of motor vehicles which is capable of selectively disposing such retractable lamps either in a housed position or in an exposed position with high accuracy.

Another important object of the present invention is to provide a driving mechanism of the above described type, which has a simple structure and is highly efficient in use.

A further object of the present invention is to provide a driving mechanism of the above described type which can be readily incorporated in motor vehicles of various types at low cost.

In accomplishing these and other objects, according to one preferred embodiment of the present invention there is provided a driving mechanism for selectively disposing retractable lamps of a motor vehicle pivotally connected to a body at a portion thereof, either in a housed position or in an exposed position, which mechanism comprises a relay link pivotally connected to the body at one end thereof, a lamp rod having one end pivotally connected to the other end of the relay link and having the other end connected to the retractable lamp, electric driving means, a motor link pivotally connected to the electric driving means and pivotally moved by the electric driving means, and a motor rod pivotally interconnecting the motor link and the relay link, the apparent longitudinal axis composed of the respective longitudinal axes of the lamp rod and the relay link together with the apparent longitudinal axis composed of the respective longitudinal axes of the motor rod and the motor link being almost aligned, respectively, when the retractable lamp is brought into the exposed state thereof.

Moreover, the longitudinal length of the lamp rod is longer than that of the relay link together and the longitudinal length of the motor rod is longer than that of the motor link.

By the foregoing arrangement, because any error in the distance the parts are driven due to the stopping actuation of the driving means is lessened by the two staged link arrangements of the present invention, the deviation of the final position of the retractable lamp from the predetermined disposition is effectively lessened and the lamp is thus positioned with a high accuracy.

Furthermore, according to the present invention, an axis passing through one end of the relay link which is pivotally connected to the body and a pivotal joint at which the motor rod is pivotally connected with the relay link, and the apparent longitudinal axis composed of the respective longitudinal axes of the motor rod and the motor link are further arranged to meet with each other at right angles at the pivotal joint described above.

Therefore, the deviation of the lamp at the final position from the predetermined disposition, especially due to an error in the driving distance and the resultant angle with respect to the axis passing through both positions described above is further improved and the lamp is positioned with a high accuracy, without any special, expensive control system being required to cause the driving means to be stopped at the predetermined operational instant.

BRIEF DESCRIPTION OF THE DRAWINGS

These and other objects and features of the present invention will become apparent from the following description of a preferred embodiment thereof taken in conjunction with the accompanying drawings in which.

Before the description of the present invention proceeds, it is to be noted that like parts are designated by like reference numerals throughout the several views of the accompanying drawings.

DETAILED DESCRIPTION OF THE INVENTION

Figure 2:
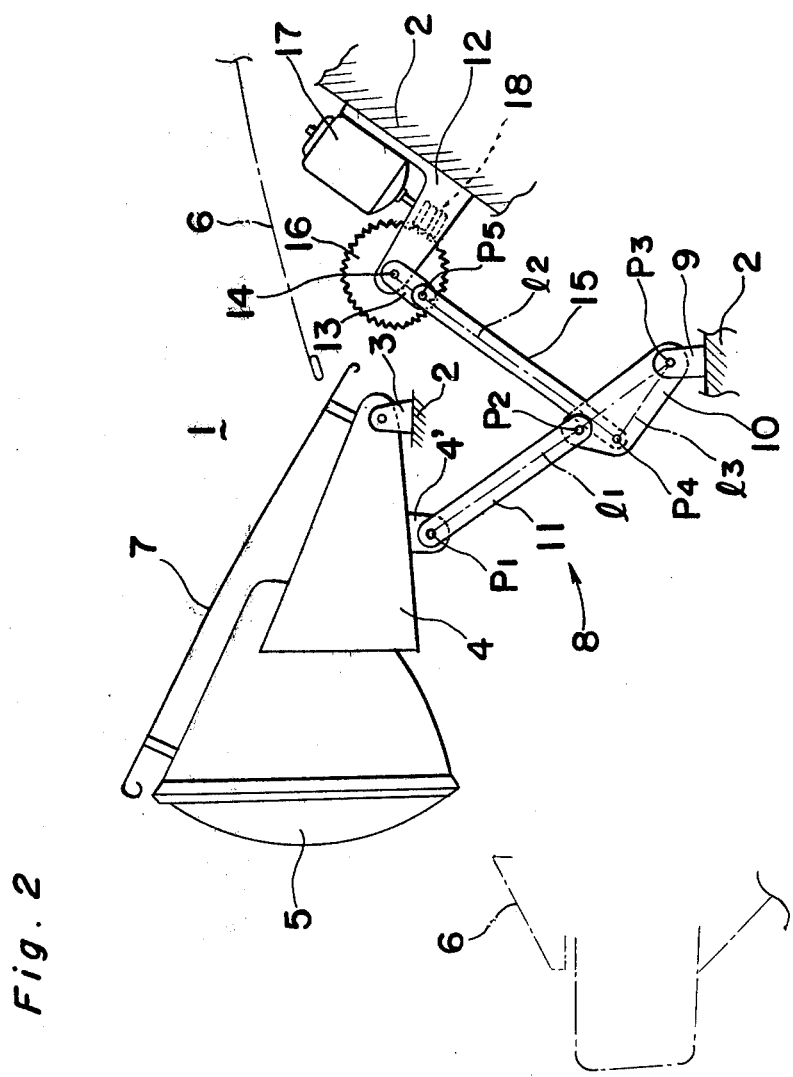
FIG. 2 is a schematic side elevational view of a driving mechanism for a retractable lamp of a motor vehicle according to the present invention and in a state in which the retractable lamp is fully exposed.
Figure 3:
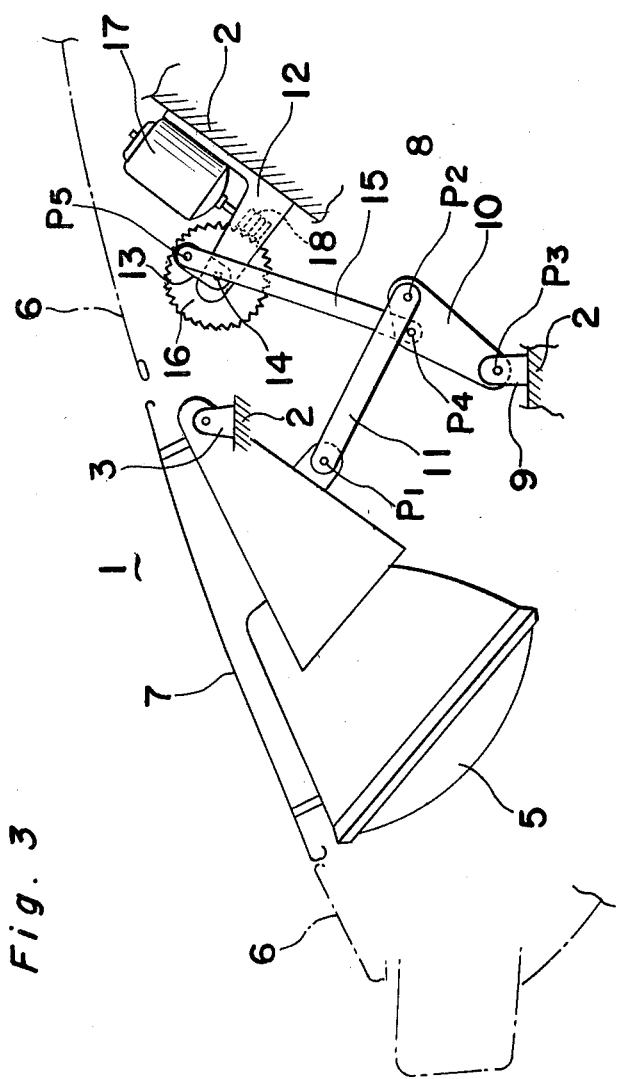
FIG. 3 is a view similar to FIG. 2, but particularly showing the driving mechanism in a state in which the retractable lamp is fully housed.

Referring now to FIGS. 2 and 3, there is shown a front portion of a motor vehicle 1 including a retractable head lamp and the driving mechanism according to the present invention. The vehicle has a chassis or body 2, and the headlamp structure of the invention has a bracket 3 secured to the body 2, a lamp holder 4 pivotally mounted on the bracket 3 at the base portion thereof, a head lamp 5 secured to the lamp holder 4 and pivotally moved together with the lamp holder 4, a lamp lid 7 covering both head lamp 5 and lamp holder 4 and arranged to be coplanarly coupled in the outer surface of a vehicle hood 6 when the head lamp 5 is fully housed, and a driving mechanism 8 connected to the lamp holder 4 at one end thereof so as to pivotally drive the head lamp 5 with respect to the bracket 3 mentioned above.

More specifically, in the driving mechanism 8 of the present invention, one end of a relay link 10 is pivotally mounted on a pivotal supporting member 9 which is secured to the body 2 at a pivotal joint denoted by $P_3$, while the opposite end of the relay link 10 is pivotally connected to one end of a lamp rod 11 at a pivotal joint denoted by $P_2$. The other end of the lamp rod 11 is further pivotally connected at a pivotal joint denoted by $P_1$ with a projection 4' provided on the bottom surface of the lamp holder 4, so that the pivotal movement of the relay link 10 with respect to the member 9 causes the lamp rod 11 to be pivotally moved and thereby, the head lamp 5 is in turn pivotally moved.

Furthermore, to the rear of the location of the head lamp 5 is the driving mechanism 8 of the present invention which comprises a motor link 13 one end of which is pivotally connected to a supporting member 12 by means of a pivotal shaft 14 which is also the shaft 14 of a worm wheel 16, while the other end of the motor link 13 is pivotally connected to one end of a motor rod 15 at a pivotal joint denoted by $P_5$. The other end of the motor rod 15 is further pivotally mounted on the relay link 10 at a pivotal joint denoted by $P_4$ and positioned in an upper middle portion of the relay link 10. The worm wheel 16 is engaged by a worm 18 secured to a main spindle or electric driving means or an electric motor 17 fixedly mounted on the supporting member 12 for driving the worm wheel 16 and thereby, the pivotal shaft 14 through the engagement between the worm 18 and the worm wheel 16.

By the arrangement as described above, the relay link 10 can be oscillated with respect to the pivotal member 9, or more particularly, with respect to the pivotal joint $P_3$ by the link mechanism which accomplishes the successive driving steps described hereinbelow.

The worm 18 secured to the main spindle of the motor 17, is firstly driven and frictionally drives the worm wheel 16 through the engagement between the worm 18 and the worm wheel 16. The motor link 13 together with the motor rod 15 which interconnects the motor link 13 and the relay link 10 are successively, pivotally driven by the rotational movement of the worm wheel 16. Subsequently, the relay link 10 is oscillated with respect to the pivotal joint $P_3$ through the relative pivotal movement of the motor rod 15 with respect to the pivotal joint $P_4$. The pivotal movement of the motor link 13 is restricted so that it is prevented from pivotal movement exceeding 180 degrees from an initial actuating position shown either in FIG. 2 or in FIG. 3.

As for the dimensional characteristics of the link mechanism mentioned above, the longitudinal length of the lamp rod 11 is longer than that of the relay link 10, while the longitudinal length of the motor rod 15 is longer than that of the motor link 13.

Specifically, according to the driving mechanism of the present invention, the housing and exposing operation of the retractable head lamp 5 are accomplished in following manner.

Referring to FIG. 2, the head lamp 5 which is now in an exposed state is housed by the following successive steps.

The driving means 17 is firstly actuated so as to drive the mechanism 8 and, thereby, the motor link 13 is pivoted to move in the rearward direction following the pivotal movement of the pivotal shaft 14 so as to retract the motor rod 15 from the extended position thereof. The relay link 10 is pivoted in the same direction with respect to the pivotal joint $P_3$ to retract the lamp rod 11 from the extended position thereof and thereby, to cause the head lamp 5 to be downwardly pivotally moved with respect to the bracket 3 and housed in the hood 6. Subsequently, the head lamp 5 is fully housed with the lamp lid 7 being fully closed in the hood 6 when the motor link 13 has been moved to a position at which further pivotal movement exceeding 180 degrees in the rearward direction mentioned above is prevented.

When the head lamp 5 is to be exposed from the body, the steps described above are carried out in the reverse order starting from the initial condition of the head lamp 5 shown in FIG. 3, wherein the lamp rod 11 drives the head lamp 5 upwards and thereby causes it to be exposed from the bonnet 6, following the pivotally forward movement through the motor link 13 of 180 degrees.

As shown in FIG. 2, according to the present invention, when the head lamp 5 is fully exposed, the relative disposition of the respective joints $P_1$ and $P_2$ at the respective ends of the lamp rod 11 and the pivotal joint $P_3$ of the relay link 10 are substantially aligned, so that an apparent longitudinal axis $l_1$ composed of the respective longitudinal axes of the lamp rod 11 and the relay link 10 are in a nearly straight line, while the relative dispositions of the respective ends $P_4$ and $P_5$ of the motor rod 15 and a pivotal center of the pivotal shaft 14 of the motor link 13 are also substantially aligned, so that an apparent longitudinal axis $l_2$ composed of the respective longitudinal axes of the motor rod 15 and the motor link 13 are also in a nearly straight line as well.

Figure 1:
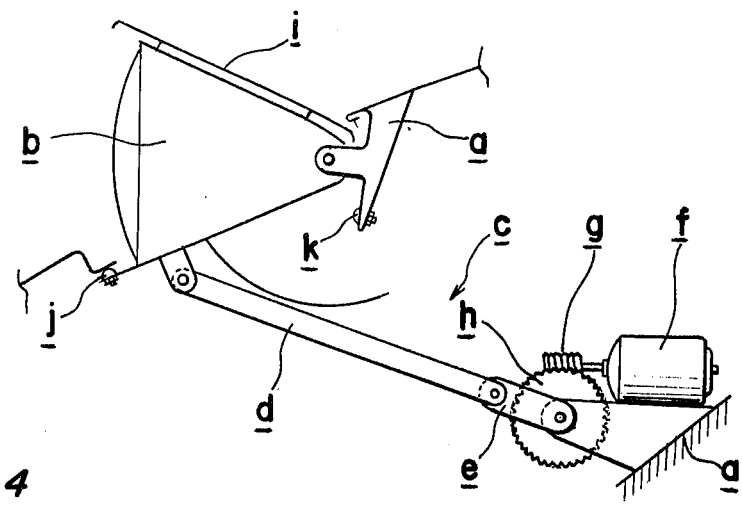
FIG. 1 is a schematic side elevational view of a conventional driving mechanism for a retractable lamp of a motor vehicle.
Figure 4:
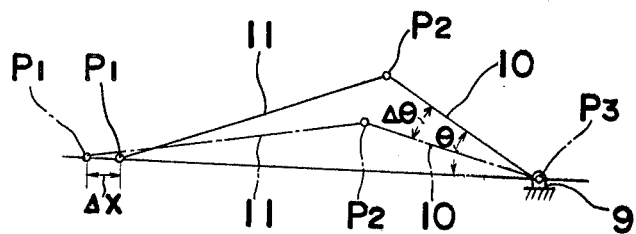
FIGS. 4, 5 and 6 are schematic diagrams for explaining relations between specific errors brought about in the final driving step to expose the retractable lamp by a link mechanism and the final link arrangements of various link mechanisms.

As specifically shown in FIG. 4, according to the link mechanism as described in the foregoing, the displacement $\Delta x$ brought about by the shift of the pivotal joint $P_1$ with respect to an initial reference point by a small variation of the angle which is denoted by $\Delta \theta$ in FIG. 4 due to the pivotal movement of the relay link 10 (from a certain initial position corresponding to the initial reference point) becomes a minimum when the initial reference point is equivalent to that in a situation in which the angle (indicated by $\theta$ in FIG. 4) made by the longitudinal axis of the relay link 10 with reference to a line interconnecting the pivotal joint $P_3$ and the pivotal joint $P_1$ is either 0 or 180 degrees.

In the other words, as is clear from the foregoing description, the situation mentioned above corresponds to a link-arrangement in which the apparent longitudinal axis $l_1$ composed of the respective longitudinal axes of the lamp rod 11 and the relay link 10 is straight. Therefore, the arrangement to cause the apparent longitudinal axis $l_1$ of the lamp rod 11 and the relay link 10 to be maintained in a straight line at the final stage of the exposing operation of the head lamp 5 will most effectively diminish any undesirable error associated therewith when causing the optical axis of the retractable lamp to lie on the predetermined optical axis even if an error in the resultant disposition of the relay link 10 is inevitable when the whole mechanism is driven to the predetermined disposition.

The resultant advantage brought about by the link-arrangement described above is naturally applicable to that constituted by the motor rod 15 and the motor link 13. Therefore, when the axis denoted by $l_2$ is brought into a straight line in the exposed state of the head lamp 5, any error in the resultant angle of by the relay link 10, which is caused by an error in the stopping of the motor link 13 will have a minimum value, and thereby, the accuracy of the disposition of the head lamp 5 is most effectively improved.

Moreover, according to the present invention, when the head lamp 5 is to be fully exposed from the hood 6, the longitudinal axis $l_2$ and an axis $l_3$ associated with the relay link 10 and interconnecting the pivotal joint $P_3$ and the pivotal joint $P_4$ are at an approximate right angle at the pivotal joint $P_4$.

Figure 5:
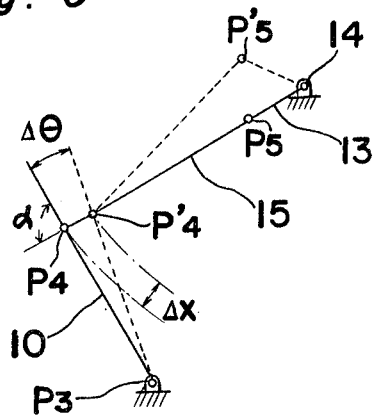

FIG. 5 illustrates an embodiment of the driving mechanism with the retractable lamp (not shown in FIG. 5) being exposed from the hood 6, in which the motor rod 15 and the motor link 13 are disposed in a manner such that the angle of intersection $\alpha$ of the longitudinal axes $l_2$ and $l_3$ is approximately a right angle.

Figure 6:
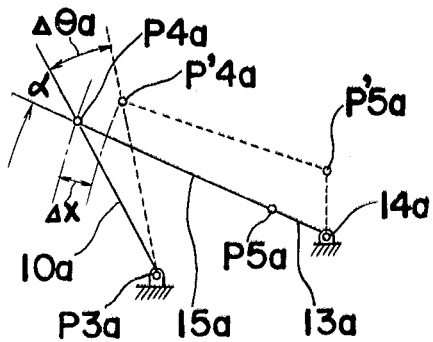

In contrast with the situation described in FIG. 5, FIG. 6 further illustrates another embodiment of the driving mechanism with the retractable lamp (not shown in FIG. 6) also being exposed from the hood 6 in which the angle of intersection $\alpha$ is less than a right angle.

As specifically shown in FIGS. 5 and 6, according to the link mechanisms illustrated in these figures, when the distance between the pivotal shaft 14 (14a) and the pivotal joint $P_4$ ($P_{4a}$) is displaced $\Delta x$ (($P_4-P'_4$) or ($P_{4a}-P'_{4a}$)) near the end of the exposing operation of the retractable lamp, the resultant variation of the angle $\Delta \theta$ associated in the relay link 10(10a) with the link arrangement shown in FIG. 6 is larger than that in the link arrangement shown in FIG. 5, and consequently, the variation of angle $\Delta \theta$ is minimized when the angle of intersection $\alpha$ of such the link arrangement is 90 degrees.

More specifically, when the apparent longitudinal axis $l_2$ of the motor rod 15 and the motor link 13 is perpendicular to the axis $l_3$ interconnecting the pivotal joint $P_3$ and the pivotal joint $P_4$, the variation of $\Delta \theta$ of the relay link 10 caused by the change of the distance between the pivotal shaft 14 and the pivotal joint $P_4$ or the displacement $\Delta x$ is minimized.

Therefore, according to the link arrangement of the present invention having the characteristic arrangement in the final part of the operation for exposing the retractable lamp as described above, the deviation of the angle of the relay link 10 from the predetermined value, which is brought about by the specific error associated with the stopping of the motor rod 15 is minimized, and thereby, the accuracy of the final exposed position of the retractable lamp is further improved.

As is clear from the foregoing description, the link mechanism for driving the retractable lamp of the present invention comprises the motor link pivotally driven through the gear engagement by the electric driving means, the relay link, the motor rod pivotally interconnecting the motor link and the relay link, the lamp rod, and the lamp holder, so that the electrically produced drive is effectively transmitted to cause the head lamp to be selectively housed in and exposed from the hood of the motor vehicle by the pivotal movement thereof. More specifically, in the driving mechanism described above, since not only the apparent longitudinal axis composed of the respective longitudinal axes of the lamp rod and the relay link, but also the apparent longitudinal axis composed of the respective longitudinal axes of the motor rod and the motor link are arranged to be straight, respectively, when the retractable head lamp is brought into the exposed state, the error accompanying the stopping of the driving means is lessened by the two stage improvements in the link arrangement of the present invention. Therefore, the deviation specifically accompanying the final of the stage disposition of the retractable head lamp from the predetermined disposition is effectively improved and given a high accuracy, and thereby the deviation of the optical axis of the head lamp from the predetermined optical axis is also minimized.

Moreover, since the mutual linkage correlation of the two stage linkage arrangement described above to expose the retractable lamp is further arranged to be terminated with the links in a certain situation thereof in which the axis passing through the pivotal joint of the relay link secured to the body and the pivotal joint connecting the relay link to the motor rod therewith intersects at right angles with the axis which longitudinally passes through the pivotal joints of the motor rod and the motor link, the deviation specifically accompanying the final stopping position of the head lamp from the predetermined position is further improved so as to position the head lamp with a high accuracy, without any special, expensive control system to cause the driving motor to be stopped at the predetermined operational instance.

Furthermore, as is clear from the description in the foregoing, the driving mechanism of the present invention has a simple structure and is highly efficient in use, and can be readily incorporated into various types of motor vehicles at low cost.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A driving mechanism for moving retractable lamps of motor vehicles which are pivotally mounted on the vehicle between a position in which they are housed in the vehicle body and a position in which they are exposed from the vehicle body, said driving mechanism comprising driving means which can be started for driving the driving mechanism and stopped when the lamp has reached the desired position, a first link connected to said driving means for being rotated around a pivot point at one end of said first link, a second link having one end pivotally connected to the vehicle, a first rod having one end pivotally connected to the other end of said second link and having the other end pivotally connected to said lamp, and a second rod pivotally connected between said first link and said second link, said links and connecting rods being positioned for, when the lamp has been moved to the exposed position, having the pivot point around which said first link is rotated by said driving means, the pivot point where said second rod is pivotally connected to said first link and the pivot point where said second rod is pivotally connected to said second link in a substantially straight line, and also having the pivot point at which said second link is pivoted on the vehicle, the pivot point at which said second link is pivoted to said first rod and the point at which said first rod is pivotally connected to the lamp aligned in a substantially straight line, whereby the error in the position of the lamp in the exposed position due to an error in the time of stopping of the driving means is minimized.

2. A driving mechanism as claimed in claim 1 in which, when the lamp has been moved to the exposed position, a line passing through the pivot point at which said second link is pivotally mounted on the vehicle and the pivot point at which said second rod is pivotally connected to said second link and the line along which said pivot point at the one end of said first link, the pivot point between the other end of said first link and the second rod and the pivot point between the second rod and said second link are substantially aligned are at right angles to each other.

3. A driving mechanism as claimed in claim 2 in which the length of said first rod is greater than that of said second link and the length of said second rod is greater than that of said first link.

4. A driving mechanism as claimed in claim 3 in which said driving means comprises a driving device having a main spindle, a worm on said main spindle, a worm wheel with which said worm is engaged, a supporting member, a shaft on said supporting member on which said worm wheel is mounted for rotation therewith, said one end of said first link being mounted on said shaft.

* * * * *

UNITED STATES PATENT AND TRADEMARK OFFICE
CERTIFICATE OF CORRECTION

PATENT NO. : 4,246,628
DATED : January 20, 1981
INVENTOR(S) : Naoyuki IKEMIZU et al It is certified that error appears in the above-identified patent and that said Letters Patent are hereby corrected as shown below:

In the heading, line [73], for "Tanaka Instrument Co., Ltd." should read -- Toyo Kogyo Co., Ltd., Hiroshima and ASMO Co., Ltd., Saitama, Japan --.

Signed and Sealed this

Fourteenth Day of July 1981

[SEAL]

Attest:

GERALD J. MOSSINGHOFF

Attesting Officer

Commissioner of Patents and Trademarks